United States Patent
White et al.

(10) Patent No.: US 8,432,472 B2
(45) Date of Patent: Apr. 30, 2013

(54) CAMERA FOR DISPLAYING DIGITAL IMAGES

(75) Inventors: Timothy J. White, Webster, NY (US); Alison Boncha, Rochester, NY (US); John Christopher Hahn, Rochester, NY (US); Christopher Watkins, Penfield, NY (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 12/579,431

(22) Filed: Oct. 15, 2009

(65) Prior Publication Data
US 2011/0090367 A1    Apr. 21, 2011

(51) Int. Cl.
*H04N 5/222*    (2006.01)

(52) U.S. Cl.
USPC ............ 348/333.01; 348/333.02; 348/333.03; 348/333.04; 348/333.05

(58) Field of Classification Search ............ 348/333.01–333.05; 345/619
See application file for complete search history.

(56) References Cited

U.S. PATENT DOCUMENTS

| | | | |
|---|---|---|---|
| 7,099,946 B2 * | 8/2006 | Lennon et al. | 709/227 |
| 2006/0220986 A1 * | 10/2006 | Takabe et al. | 345/9 |
| 2006/0250419 A1 * | 11/2006 | Shiba et al. | 345/619 |

* cited by examiner

*Primary Examiner* — Yogesh Aggarwal
(74) *Attorney, Agent, or Firm* — Wong, Cabello, Lutsch, Rutherford & Brucculeri LLP

(57) ABSTRACT

A camera includes memory for storing one or more stored images each with at least a day and month of capture; a processor which, based on the stored images, determines which day and month at least an image was captured; and a display that displays only the day and month on which at least an image was captured along with a visual indicator of whether a plurality of images was captured on the displayed day and month.

2 Claims, 3 Drawing Sheets

CAMERA FOR DISPLAYING DIGITAL IMAGES

CROSS-REFERENCE TO RELATED APPLICATION

Reference is made to commonly assigned, co-pending U.S. patent application Ser. No. 12/579,429, filed herewith, entitled "A Method for Displaying Digital Images", by Timothy J. White, et al.

FIELD OF THE INVENTION

The present invention generally relates to presentation of images on a camera display and more particularly to such camera displays which efficiently displays images by displaying only the dates on which there are corresponding captured images along with an indication of whether there are multiple images (images are inclusive of still images and/or videos) or a single image on the displayed dates.

BACKGROUND OF THE INVENTION

Currently, digital cameras capture still and video images which are subsequently stored in memory. The still or video images can then be displayed by the user on the camera display at his and/or her pleasure. In some cameras, in order to enhance the viewing experience, a graphical calendar with each day is displayed, and an indicator is placed on the dates on which images were captured that particular day. The user may then select a particular date, and the images on that particular date are then displayed. In other cameras, all the images from a particular day are displayed at one-time, and the days are then scrolled through with all the images from that particular day being displayed.

Although the current cameras are satisfactory for displaying images, improvements are always desirable. More particularly, further human-factor efficiencies are desirable to enhance the viewing of images on the camera display. For example, since the area of the camera display is limited, better use of displaying the images is desirable. One such better use is eliminating dates that do not have images since they are not of interest to the user. Another better use would be to eliminate showing the images day-by-day in sequence since images from some days may not be of interest to the user. The present invention provides such improvements.

SUMMARY OF THE INVENTION

The present invention is directed to overcoming one or more of the problems set forth above. Briefly summarized, according to one aspect of the invention, the invention resides in a camera for presenting images, the camera comprising (a) memory for storing one or more stored images each with at least a day and month of capture; (b) a processor which, based on the stored images, determines which day and month at least an image was captured; and (c) a display that displays only the day and month on which at least an image was captured along with a visual indicator of whether a plurality of images was captured on the displayed day and month.

These and other objects, features, and advantages of the present invention will become apparent to those skilled in the art upon a reading of the following detailed description when taken in conjunction with the drawings wherein there is shown and described an illustrative embodiment of the invention.

Advantageous Effect of the Invention

The present invention has the advantage of providing efficient display of images on a camera display by eliminating unnecessary information.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
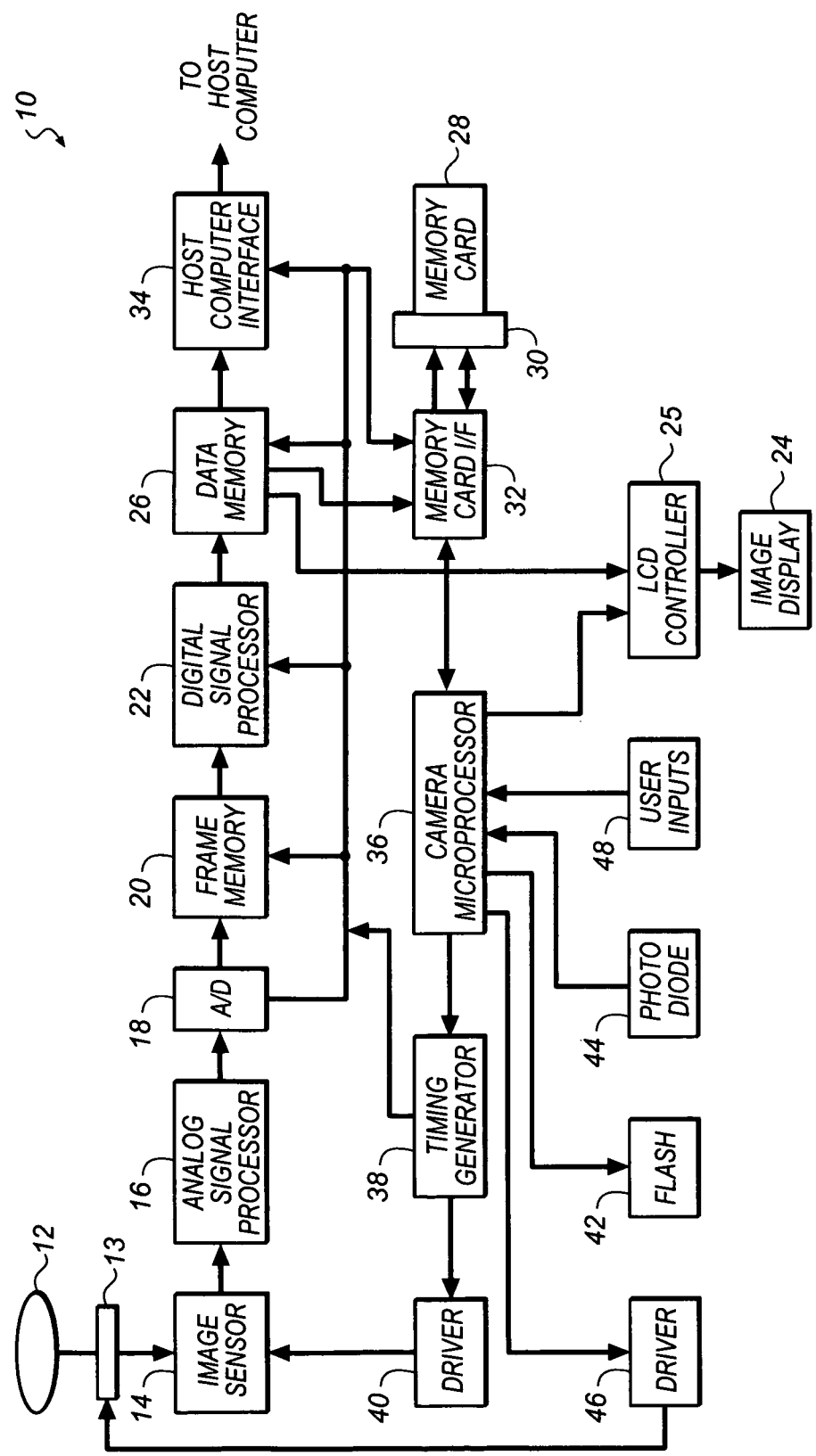
FIG. 1 is a block diagram of the camera of the present invention.

Before describing the present invention, it is noted that, as used herein, "images" are defined as still images and/or video images. Referring to FIG. 1, a block diagram of an exemplary digital camera 10 in accordance with a first embodiment of the present invention is shown. As shown in FIG. 1, the digital camera 10 includes a lens 12 which directs image light from a subject (not shown) through an aperture/shutter controller 13 upon an image sensor 14 having a discrete number of photosensitive sites or pixels arranged in a two-dimensional array to form individual photosensitive sites corresponding to the pixels of the image. The image sensor 14 can be a charge coupled device (CCD) sensor or a complementary metal oxide semiconductor (CMOS) imager. The photosensitive sites of the image sensor 14 collect charge in response to incident. Each photosensitive site is overlaid with a color filter array (CFA), such as the Bayer CFA described in commonly-assigned U.S. Pat. No. 3,971,065, the disclosure of which is herein incorporated by reference. The Bayer CFA has 50% green pixels in a checkerboard-pattern mosaic, with the remaining pixels alternating between red and blue rows. The photosensitive sites respond to the appropriately colored incident light illumination to provide an analog signal corresponding to the intensity of illumination incident on the photosensitive sites.

The analog output of each pixel is amplified and analog processed by an analog signal processor (ASP) 16 to reduce the image sensor's output amplifier noise. The output of the ASP 16 is converted to a digital image signal by an analog-to-digital (A/D) converter 18, such as, for example, an 8 bit A/D converter which provides an 8 bit signal in the sequence of the Bayer CFA.

The digitized image signal is temporarily stored in a frame memory 20, and is then processed and compressed by a digital signal processor (DSP) 22. The image processing typically includes white balance, color correction, tone correction, and image sharpening. The DSP 22 also decimates (or re-samples) the digitized image signal for each still image to produce a thumbnail image having fewer pixels (i.e., lower resolution) than the original captured image as described in commonly-assigned U.S. Pat. No. 5,164,831 to Kuchta et al., the disclosure of which is herein incorporated by reference. The image file containing both the full resolution image and the thumbnail image is stored in a data memory 26, and then transferred through a memory card interface 32 to a memory card 28 that is present in a memory card slot 30 of the digital camera 10. The thumbnail image is also sent to an image display 24 through an LCD controller 25 where the user can view the image. Although the display is shown as an LCD display, OLED displays may also be used. The image display 24, which is shown in more detail in FIG. 2 and which will be discussed later, includes a conventional arrangement for displaying the captured image or images. The image display 24 may, alternatively, utilize many other types of raster image displays, including miniature CRT's, organic light emitting diode (OLED) arrays, or field emission displays.

The memory card 28 can be adapted to the PCMCIA card interface standard, such as described in the PC Card Standard, Release 2.0, published by the Personal Computer Memory Card International Association, Sunnyvale, Calif., September 1991. The memory card 28 can also be adapted to the Compact Flash interface standard, such as described in the CompactFlash Specification Version 1.3, published by the CompactFlash Association, Palo Alto, Calif., Aug. 5, 1998.

Electrical connection between the memory card 28 and the digital camera 10 is maintained through a card connector (not shown) positioned in the memory card slot 30. The memory card interface 32 and the card connector provide, e.g., an interface according to the aforementioned PCMCIA card or CompactFlash interface standard. The image file may also be sent to a host computer (not shown), which is connected to the digital camera 10 through a host computer interface 34.

In operation, a camera microprocessor 36 receives user inputs 48, such as from a shutter release (not shown), and initiates a capture sequence by signaling a timing generator 38. The timing generator 38 is connected generally to the elements of the digital camera 10, as shown in FIG. 1, for controlling the digital conversion, compression, and storage of the image signal. The camera microprocessor 36 also processes a signal from a photodiode 44 for determining a proper exposure, and accordingly signals an exposure driver 46 for setting the aperture and shutter speed via the aperture/shutter controller 13 and triggers a flash unit 42 (if needed). The image sensor 14 is then driven from the timing generator 38 via a sensor driver 40 to produce the image signal. The user inputs 48 are used to control the operation of the digital camera 10 in a well-known manner.

Figure 2:
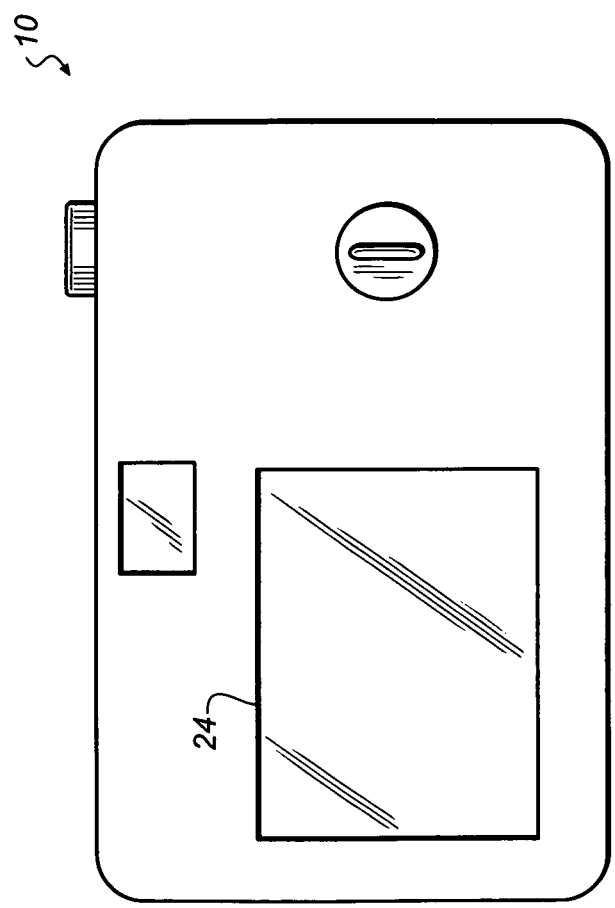
FIG. 2 is perspective view of a camera display.

Referring to FIG. 2, there is shown a back view of the camera 10 of the present invention having an exploded view of the display 24. The display 24 is capable of displaying either still images or video images in a plurality of resolutions. For example, in the present invention, thumbnail images are preferably displayed in low resolution, and still images that typically cover the entire display are preferably displayed in high resolution. Video images are preferably displayed in low resolution to provide an efficient display rate.

Figure 3:
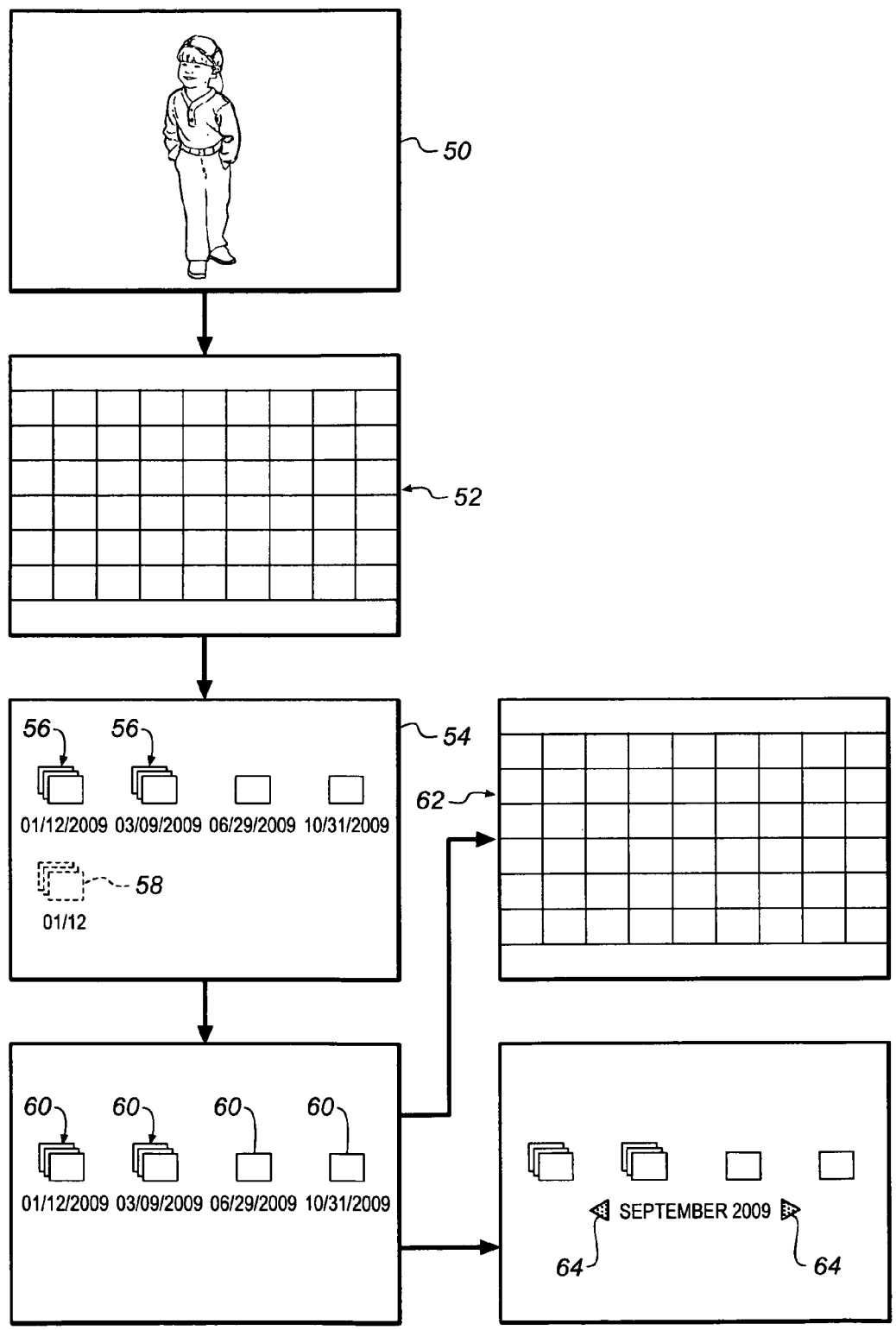
FIG. 3 is a block diagram in a flowchart format illustrating the operation of displaying images on the display of the present invention.

Referring to FIG. 3, there is shown an illustration of the operation of the camera 10 of the present invention. It is understood that, prior to the reviewing of images described herein below, images have been captured and stored in memory 28, and the processor 36 directs the steps described herein below. Initially, when the camera 10 is in review mode, a still image 50 is displayed on the display 24, and the images may be scrolled through one-at-a-time by using the user inputs 48. The user may then display a portion of the images (if there are more images than can be displayed) as a plurality of thumbnail images via 52 user inputs 48. If necessary, the remaining images may then be displayed by scrolling through the plurality of thumbnails using the user inputs 48.

The user then uses the user inputs 48 to display the images by date 54. It is noted that only the dates with either still or video image(s) are displayed. Dates in which there are no images are omitted from being displayed. The dates with multiple images (i.e., a plurality of images) are graphically indicated by a graphical indicator in the form of a stack 56. In an alternative embodiment, only the day and month 58 may be displayed since the year is inherently known by the user.

By pressing one of the user inputs 48, the user navigates to a row of selectable images 60 arranged chronologically by date, and is then able to move left/right through all days in which image(s) were captured through use of user inputs 48. As previously stated, days in which no images were captured are not displayed. In FIG. 3, for example, the date of Jan. 12, 2009, is selected. The user can then view each of the images 62 on that particular date through use of user inputs 48.

By pressing another one of the user inputs 48, the user navigates to a control 64 for moving through the set of images captured by month. The months and/or years in which no images were captured are not displayed. While, the invention discloses a specific flow of the images, the flow of images may be arranged without departing from the scope of the invention.

In summary, the invention is a camera for presenting images. The camera comprises memory for storing one or more stored images each with at least a day and month of capture; a processor which, based on the stored images, determines which day and month at least an image was captured; and a display that displays only the day and month on which at least an image was captured along with a visual indicator of whether a plurality of images was captured on the displayed day and month.

The invention has been described in detail with particular reference to certain preferred embodiments thereof, but it will be understood that variations and modifications can be effected within the spirit and scope of the invention.

PARTS LIST

10 Camera
12 Lens
13 Aperture/shutter controller
14 Image Sensor
16 Analog Signal Processor
18 A/D converter
20 Frame Memory
22 Digital Signal Processor
24 Image display
25 LCD controller
26 Data Memory
28 Memory card
30 Memory card slot
32 Memory card interface
34 Host Computer Interface
36 Camera Microprocessor
38 Timing Generator
40 Driver
42 Flash
44 Photodiode
46 Driver
48 User Inputs
50 Image
52 Thumbnail Images
54 Images by Date
56 Stack
58 Day and Month
60 Selectable Images
62 Thumbnail Images
64 Control

The invention claimed is:

1. A camera for presenting images, the camera comprising:
   (a) memory for storing one or more stored images each with at least a day and month of capture;
   (b) a processor which, based on the stored images, determines which day and month at least an image was captured; and
   (c) a display that displays only the day and month on which at least an image was captured along with a visual indicator of whether one or a plurality of images was captured on the displayed day and month; and wherein the visual indicator is a plurality of stacks in which one image is represented by one graphical indictor in a stack and a plurality of images are represented by a plurality of graphical indictors in a stack, and the plurality of stacks does not display actual image or images in any resolution that have been captured and stored in the memory.

2. The camera as in claim 1, wherein the stored images include a year associated with each stored image which is displayed with the corresponding day and month.

* * * * *